3,337,653
PHOSPHORO DERIVATIVES OF α-(METHYL-
THIO) CRESOLS
Karoly Szabo, Orinda, Calif., and John Gary Brady, West
Chester, Pa., assignors to Stauffer Chemical Company,
New York, N.Y., a corporation of Delaware
No Drawing. Filed Apr. 15, 1964, Ser. No. 360,061
6 Claims. (Cl. 260—948)

This invention relates to certain novel chemical compounds and to the use of such compounds as insecticides, acaricides and the like. More specifically, this invention relates to phosphoro derivatives of α-(methylthio) cresols corresponding to compounds of the formula

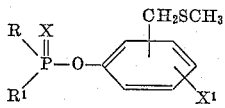

wherein R is selected from the group consisting of lower alkyl, lower alkoxy and phenyl, $R^1$ is lower alkoxy, X is selected from the group consisting of sulfur and oxygen, and $X^1$ is selected from the group consisting of halogen, nitro and lower alkyl radicals.

The compounds of the present invention can be prepared by contacting a substituted phenolic sulfide with an appropriate phosphorylating agent in the presence of an inorganic base, such as potassium hydroxide, or a tertiary N-base such as pyridine, triethylamine and the like. Examples of said phosphorylating agents are the O,O-disubstituted - phosphorochloridates, O,O - disubstituted phosphoro-chloridothioates, substituted phosphono-chloridates and substituted phosphonochloridothioates. The preparation of compounds of a phenolic character which may be used as starting materials is described by Long and Moss in U.S. Patent 2,976,325.

The compounds of the present invention can be made as further illustrated in the following examples: Compound numbers have been assigned to each compound according to the example number in which it is prepared and are used hereinafter for convenience.

EXAMPLE 1

O-ethyl-O-[α⁴-(methylthio)-2,4-xylyl]-
ethylphosphonothioate

Equal molar portions (0.04 M) of α⁴-(methylthio)-2,4 - xylenol and O-ethyl-ethylphosphonochloridothioate were allowed to react in methylethyl ketone with 4.3 g. of triethylamine present. The mixture was refluxed for 8 hours at 83° C. The amine hydrochloride formed was filtered out. The filtrate was washed with 1% sodium hydroxide solution (100 ml.) and water (50 ml.) subsequently. The organic layer was separated and dried over anhydrous magnesium sulfate and filtered. The organic solvent was removed by heating to 140° C. at 0.5 mm. pressure. The product obtained analyzed correctly for sulfur and phosphorous values according to the assigned structure and had a refractive index of 1.5457.

EXAMPLE 2

O-ethyl-O-[2-chloro-α-(methylthio)-p-tolyl]-
ethylphosphonothioate

In the same manner as Example 1, 2-chloro-α-(methylthio)-p-cresol was allowed to react with O-ethyl-ethylphosphonochloridothioate. The product obtained was a pale yellow oil with a refractive index of 1.5617 at 24° C.

EXAMPLE 3

O,O-diethyl-O-[2-chloro-α-(methylthio)-p-tolyl]-
phosphorothioate

In the same manner as Example 1, 2-chloro-α-(methylthio-p-cresol was allowed to react with O,O-diethylphosphorochloridothioate. The product obtained was a light brown oil with a refractive index of 1.5490 at 25° C.

EXAMPLE 4

O,O-dimethyl-O-[2-chloro-α-(methylthio)-p-tolyl]-
phosphorothioate

An amount (10.5 g) of sodium-O-chloro-α-(methylthio)-p-cresolate was allowed to react with 8 g. of O,O-dimethylphosphorochloridothioate in 80 ml. of methylethyl ketone. The mixture was heated to reflux for 3 hours. The reaction mixture was poured into water and the product extracted with benzene. The organic solvent was removed in vacuo at 120° C. and 0.77 mm. pressure. The product obtained (11.5 g.) was a yellow oil with a refractive index of 1.5793.

EXAMPLE 5

O-n-propyl-O-[2-chloro-α-(methylthio)-p-tolyl]-
ethylphosphonothioate

In the same manner as Example 1, 2-chloro-α-(methylthio)-p-cresol was allowed to react with O-n-propylethylphosphonochloridothioate. The product was a pale yellow oil with a refractive index of 1.5522 at 25° C.

EXAMPLE 6

O-methyl-O-[2-chloro-α-(methylthio)-p-tolyl]-
ethylphosphonothioate

In the same manner as Example 1, 2-chloro-α-(methylthio)-p-cresol was allowed to react with O-methylethylphosphonochloridothioate. The product was obtained in a yield of 97 percent and had a refractive index of 1.5622 at 25°.C.

EXAMPLE 7

O-ethyl-O-[2-chloro-α-(methylthio)-p-toly]-
phenylphosphonothioate

In the same manner as Example 1, 2-chloro-α-(methylthio-p-cresol was allowed to react with O-ethylphenylphosphonochloridothioate. The product was obtained in a quantitative yield. It had a refractive index of 1.5877 at 25° C.

EXAMPLE 8

O-ethyl-O-[2-chloro-α-(methylthio)-p-toly]-
chloromethylphosphonothioate

In the same manner as Example 1, 2-chloro-α-(methylthio)-p-cresol was allowed to react with O-ethyl-chloromethylphosphonochlororidothioate. The product was obtained in a yield of 82%, refractive index 1.5754 at 25° C.

EXAMPLE 9

O,O-diethyl-O-[4,6-dichloro-α-(methylthio)-O-tolyl]-
phosphorothioate

In the same manner as Example 1, 2,4-dichloro-α-(methylthio)-o-cresol was allowed to react with O,O-diethyl-phosphorochloridothioate. The product was obtained in a yield of 79%, refractive index 1.5587 at 25° C.

EXAMPLE 10

O-ethyl-O-[4,6-dichloro-α-(methylthio)-o-tolyl]-ethyl-
phosphorothioate

In the same manner as Example 1, 2,4-dichloro-α-(methylthio)-o-cresol was allowed to react with O-ethyl-ethylphosphonochloridothioate to give a yield of 90% with a refractive index of 1.5653 at 25° C.

EXAMPLE 11

*Diethyl-[2-chloro-α-(methylthio)-p-tolyl]-phosphate*

In the same manner as Example 1, 2-chloro-α-(methylthio)-p-cresol was allowed to react with diethylphosphorochloridate. The product was obtained in a yield of 86 percent and had a refractive index of 1.5235 at 25° C.

EXAMPLE 12

*O-ethyl-O-[2-nitro-α-(methylthio)-p-tolyl]-methyl phosphonate*

In the same manner as Example 1, 2-nitro-α-(methylthio)-p-cresol was allowed to react with O-ethyl-methylphosphonochloridate to give a 78% yield of the title compound.

The compounds were tested as insecticides according to the following method:

*Insecticidal evaluation test.*—Eight of the compounds were tested as insecticides against houseflies (HF), *Musca domestica* (Linn.). Test insects are caged in cardboard mailing tubes 3⅛″ in diameter and 2⅝″ tall. Twenty-five female flies, three to five days old, are caged in the tubes. The tubes are supplied with cellophane bottoms and coarse mesh nylon tops. The candidate toxicant is dissolved in a volatile solvent, preferably acetone. The active compound is pipetted into a Petri dish bottom, allowed to air dry and placed in the mailing tube cages. The flies are continuously exposed to the known residue of the active compound in the cage. After twenty-four and forty-eight hours, counts are made to determine living and dead insects. The LD50 values are calculated using well known procedures.

The compounds of this invention were also found to control American cockroach, *Periplaneta americana* (Linn.), large milkweed bug, *Oncopeltus fasciatus* (Dallas) and two-spotted mites, *Tetranychus telarius* (Linn.). Compound number 2 was found to be particularly effective in the control of pea aphid. The percent concentration suitable for pea aphid control (LD50 value) was <0.001.

The compounds of the present invention may be applied to a pest habitat in ways well known to those skilled in the art, such as dusts, sprays of solutions or dispersions and the like.

Various changes and modifications may be made without departing from the spirit and scope of the invention described herein as will be apparent to those skilled in the art to which it pertains. It is accordingly intended that the present invention shall only be limited by the scope of the appended claims.

We claim:
1. A compound of the formula

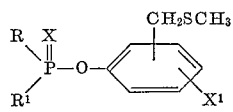

wherein R is selected from the group consisting of lower alkyl, lower alkoxy and phenyl radicals, $R^1$ is lower alkoxy, X is selected from the group consisting of sulfur and oxygen and $X^1$ is selected from the group consisting of chlorine, nitro and lower alkyl radicals.

2. The compound O-ethyl-O-[2-chloro-α-(methylthio)-p-tolyl]-ethylphosphonothioate.

3. The compound O,O-diethyl-O-[2-chloro-α-(methylthio)-p-tolyl]-phosphorothioate.

4. The compound O-ethyl-O-[2-nitro-α-(methylthio)-p-tolyl]-methylphosphonate.

5. The compound O-ethyl-O-[4,6-dichloro-α-(methylthio)-O-tolyl]-ethylphosphonothioate.

6. The compound O-ethyl-O-[2-chloro-α-(methylthio)-p-tolyl]-phenylphosphonothioate.

| Insect Specie | Compound Code (LD50 values μg.) | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| HF | 75 | 10 | 30 | >100 | 30 | 30 | 30 | >100 | 30 | 30 | <100 | 75 |

References Cited

UNITED STATES PATENTS

| | | | |
|---|---|---|---|
| 2,611,729 | 9/1952 | Bartlett et al. | 167—30 |
| 2,793,224 | 5/1957 | Fancher | 260—461 |
| 2,995,487 | 8/1961 | Jones et al. | 167—30 |
| 3,054,756 | 9/1962 | Holtschmidt | 260—461.112 X |
| 3,061,586 | 10/1962 | Thompson | 260—461.112 X |
| 3,089,893 | 5/1963 | Dever et al. | 260—461 |

CHARLES B. PARKER, *Primary Examiner.*

J. S. LEVITT, *Examiner.*

G. A. MENTIS, A. H. SUTTO, *Assistant Examiners.*